United States Patent
Jackson

(10) Patent No.: US 8,699,683 B1
(45) Date of Patent: Apr. 15, 2014

(54) EXTENDED DIALING PLAN USING DIALABLE SPECIAL CHARACTER DIGITS

(75) Inventor: Phillip Bernard Jackson, Easton, PA (US)

(73) Assignee: Cellco Partnership, Basking Ridge, NJ (US)

( * ) Notice: Subject to any disclaimer, the term of this patent is extended or adjusted under 35 U.S.C. 154(b) by 154 days.

(21) Appl. No.: 12/982,008

(22) Filed: Dec. 30, 2010

(51) Int. Cl.
*H04M 1/56* (2006.01)
*H04M 15/06* (2006.01)

(52) U.S. Cl.
USPC .................................................. 379/142.18

(58) Field of Classification Search
USPC .................................................. 379/142.18
See application file for complete search history.

(56) References Cited

U.S. PATENT DOCUMENTS

| | | | |
|---|---|---|---|
| 6,021,126 A | 2/2000 | White et al. | |
| 6,278,701 B1 | 8/2001 | Ayyagari et al. | |
| 6,397,055 B1 | 5/2002 | McHenry et al. | |
| 7,289,621 B2 | 10/2007 | Addicks | |
| 7,317,908 B1 * | 1/2008 | Eason | 455/413 |
| 7,839,982 B2 | 11/2010 | Dalrymple et al. | |
| 8,385,537 B1 * | 2/2013 | Yablon | 379/355.06 |

* cited by examiner

*Primary Examiner* — Alexander Jamal

(57) ABSTRACT

An exemplary extended dialing plan allows use of one or more special characters, such as the # digit and the * digit, as dialable digits. The telecommunications network receives a string of characters representing a destination address from a first communication device, for use in routing a communication through the network to a second communication device. The received string of characters includes a number digit in the first position in the string and at least one non-numerical special character in another position. The character string is received from the first communication device by the network, the character string is analyzed and used to route the communication through the telecommunication network to the destination address based at least in part on the character string with at least one non-numerical special character.

20 Claims, 4 Drawing Sheets

EXTENDED DIALING PLAN USING DIALABLE SPECIAL CHARACTER DIGITS

TECHNICAL FIELD

The present discussion relates to techniques and equipment to extend a dialing plan for a telecommunication network to allow use of one or more special characters, such as the # digit and the * digit, as dialable digits.

BACKGROUND

In recent years, the capabilities of various telephone communication networks in North America as well as the capabilities of various devices that may communicate through the most modern networks have developed at an almost exponential pace. Many homes have broadband connectivity for video and Internet access services instead of or in addition to traditional telephone service. Many families also have several mobile devices for voice calls, for various messaging functions and for multimedia communications. Mobile networks also offer wireless broadband data connectivity. To support such communications, each end point or device requires an address, for example, a telephone number of the like.

The North American Numbering Plan (NANP) is the numbering plan originally developed for the Public Switched Telephone Network (PSTN) for Canada, the US and its territories, and the Caribbean. In North America, NANP compliant telephone numbers are used for routing of traditional telephone calls through landline and wireless networks as well as telephone calls through various packet or broadband networks. However, many other communications today utilize telephone type numbers under NANP as source and destination addresses through the various networks.

For example, currently, anything that uses a wireless internet connection, including computers, cell phones, etc., is identified by the network using a unique assigned telephone type number As the U.S. moves to 4G service, more and more devices, such as onboard navigation systems, iPads, TVs, and other products are being developed with features that allow these products to connect to the wireless internet. This function enables each device to not only communicate via voice, but also via email, SMS messages, or MMS messages. As such, the supply of existing telephone number is decreasing rapidly.

Hence a need exists for a new dialing plan that will substantially increase the available amount of device or end point addresses, to meet the ever increasing demand.

SUMMARY

The teachings in this disclosure relate to techniques and equipment to provide an extended dialing plan for a telecommunication network by using of one or more special characters.

A method of routing communications through a telecommunications network is disclosed. The telecommunications network receives a string of characters representing a destination address from a communication device for use in routing a communication through the network. The destination address is associated with a second communication device. In the method disclosed, the received string of characters includes number digits and at least one non-numerical special character. A number digit is in the first position within the string, and at least one non-numerical special character is located in another position within the string.

Once the character string is received from the first communication device by the network, the character string is analyzed. In response to the analysis of the character string, the communication is routed through the telecommunication network to the destination address based at least in part on the character string with at least one non-numerical special character. In some examples, the character string represents an 10-digit telephone type number.

Other concepts relate to equipment, e.g. networks or elements for use in a network, configured to process communications using the dialing plan. Still other concepts relate to software for configuring a network element to implement communication control or routing based on the dialing plan. A software product may include at least one machine-readable medium and information carried by the medium. The information carried by the medium may be executable program code for the network elements, and/or information such as a database or routing table, for implementing the dialing plan.

In the current phone number system, the special characters # and * are used as indicators for certain actions and are available on all phones, but they are not used as dialable digits. The examples discussed in the detailed description below add exemplary non-numerical special characters * and # as dialable digits in North America in addition to the 0-9 digits that are already available. In the current system, a switch, router or server is sent a series of signals (e.g. tones or digital data signals) representing digits of a communication address in a particular order to determine the phone number being identified. For a telephone call, for example, the dialed number identifies the destination. A mobile device will send a similarly formatted number to identify the device making the call. A landline network may use automatic number identification to obtain the number of the source of the call.

The network identifies location and identity of the sender by the source telephone number and identifies the location and identity of the destination, using a digit by digit analysis where the placement of each digit (or tone) is assigned a certain meaning. For example, under the current system, the first three digits of a 10-digit telephone number represent the geographic area code associated with the number. What the placement of the digit means is determined using a look up table. The current system uses # and * digits for special features as they are already included on most standard telephone dialing pads, but there is no placement for them in regular 10-digit source or destination telephone numbers. The examples therefore would add the special characters # and * as dialable digits that may be placed anywhere after the first position (e.g. in any of the second to tenth positions of a 10-digit telephone number) in the dialing plan such that they may be used in a telephone number that is understood during the digit by digit analysis.

The examples offer one or more advantages, such as substantially increasing the number of telephone number type addresses available under the dialing plan for assignment to various terminal devices or end points of the telecommunications networks that utilize such numbers for routing communications. Upgrading to such a numbering plan may only require updating of the software and look up table in the network routing/control elements, because these elements are already configured to detect and process the # and * digits and because transmission capabilities for those digits are already included on every phone or the like that may utilize the network(s).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various techniques and equipment disclosed herein relate to routing a communication through a telecommunication network to a destination address represented by a string of characters including at least one non-numerical special character.

Figure 1:
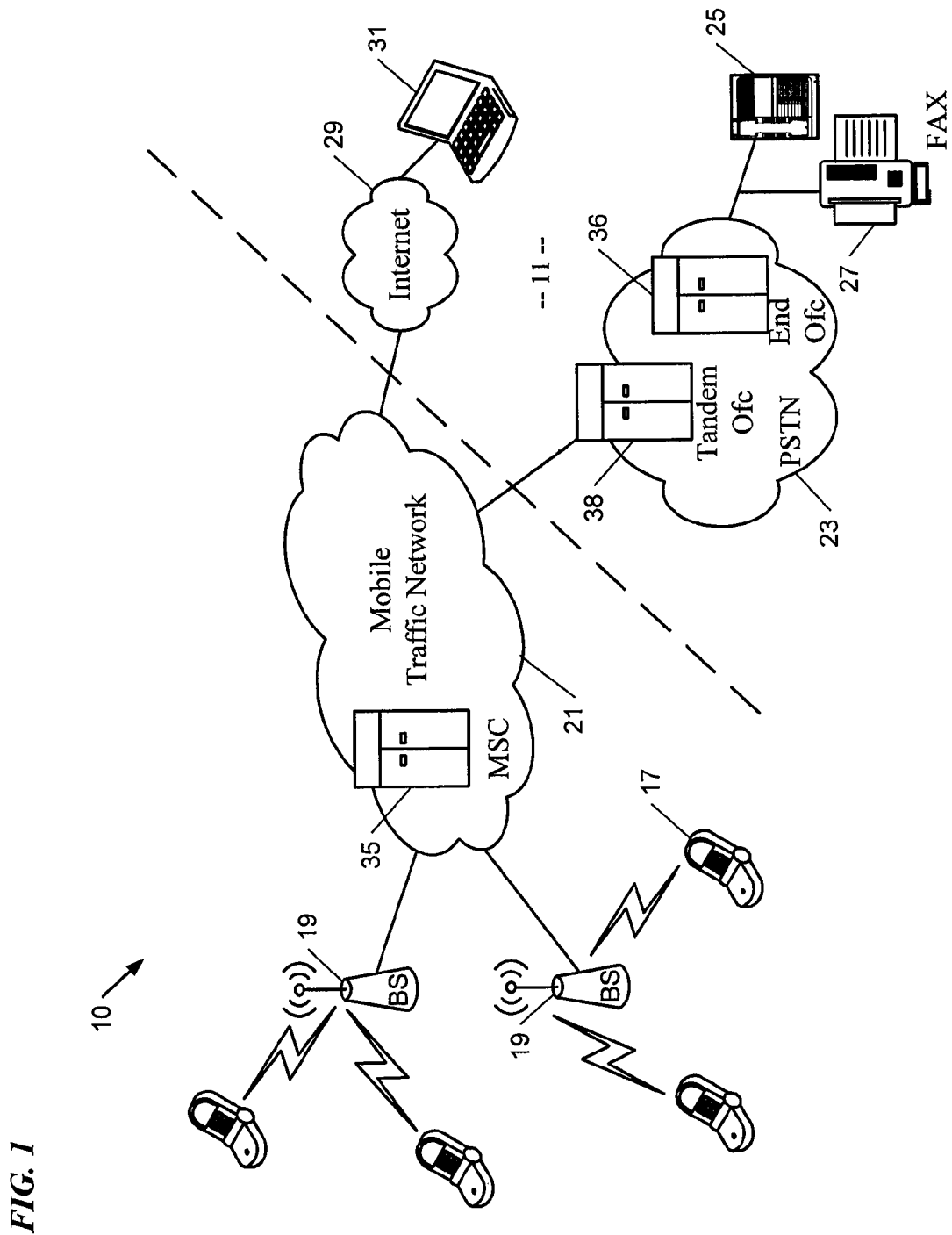
FIG. 1 illustrates a functional block diagram of a telecommunications network including elements/systems that may be utilized to process and route a communication through the telecommunications network to a destination address based on a character string including at least one non-numerical special character.

Reference now is made in detail to the examples illustrated in the accompanying drawings and discussed below. With this overview, FIG. 1 illustrates a functional block diagram of a telecommunication network which may use character strings which include non-numerical special digits to route communications through the network. Telecommunication network shown in FIG. 1 may include, but is not limited to, mobile communication networks, Public Switched Telephone Networks ("PSTNs"), one or more Voice over Internet Protocol ("VoIP") networks, overlay VoIP networks (e.g., a VoIP network overlaid on a PSTN) or any combination or subset of the above-listed networks. A cable service provider network which offers a combination of video, data, and telephone services may also be used.

A mobile network 10 may be operated by a mobile carrier or service provider to provide a wide range of mobile communication services and ancillary services or features to its subscriber customers and associated mobile station ("MS") users. The elements indicated by the reference numeral 10 generally are elements of the network and are operated by or on behalf of the carrier, although the mobile stations and other communication devices typically are sold to the carrier's customers.

The mobile network 10 includes a mobile traffic network 21 which is connected to Internet 29 as well as to PSTN 23 for connecting various communication devices within the network with those outside the mobile network 10. For example, the communication network 10 provides communications between different communication devices such mobile stations 13, 15, 17 and also allows for communication with devices outside the mobile network 10 such as landline telephones 25 connected to PSTN 23 or a computer device 31 connected via the Internet 29.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements. A regional portion of the network 10, such as that serving mobile stations 13, 15 will typically include one or more RANs and a regional circuit and/or packet switched network and associated signaling network facilities.

Physical elements of a RAN operated by one of the mobile service providers or carriers include a number of base stations represented in the example by the base stations (BSs) 19. Although not separately shown, such a base station 19 typically comprises a base transceiver system ("BTS") which communicates via an antennae system at the site of base station and over the airlink with one or more of the mobile stations 13, 15, when the mobile stations are within range. Each base station typically includes a BTS coupled to several antennas mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 between the base stations 19 and other elements of the mobile network 10. Except for one MSC 35, shown by way of an example, individual elements such as switches and/or routers forming the traffic network 21 are omitted here for simplicity.

Each wireless service provider operates a number of base stations 19 (one of which is shown for each) and mobile switching centers (MSCs) 35, to provide mobile wireless communication services. Each base station 19 typically includes a base transceiver system (not shown) which communicates via antennae of the base station and over the airlink with the mobile stations 13, 15, 17 when within range. The MSC 35 provides circuit or in some cases packet switched communications to/from the mobile stations and other networks or elements. A wireless service provider's network typically includes a base station controller functionality that controls the functions of a number of base stations and helps to manage how calls made by each mobile station are transferred (or "handed-off") from one serving base station to another. Some providers include this functionality as part of their MSC switch. Communications between different mobile stations at different base stations 19 can be completed through the wireless network path between base stations and the MSC 35.

The traffic network portion 21 of the mobile communication network 10 also connects to a public switched telephone network 23. In the example, the traffic network portion 21 is interfaced and interconnected with PSTN 23 which allows the network 10 to provide voice grade call connections through an MSC 35 for communications of the mobile stations with landline telephones 25 connected to the PSTN 23. The PSTN 23 also provides connections to other types of customer premises equipment, such as facsimile or 'FAX' machines 27. The MSCs 35 route calls and other types of communications to and from the mobile stations 13, 15, 17 based on source and destination addresses formatted like ten-digit telephone number type character strings. In the dialing plan discussed herein, the first character may be a special character like # or *, but will typically be a number digit 0-9. Each telephone number type address for a source or destination will include one or more special characters, typically in positions other than the leading first position of each respective character string.

The PSTN telephone network 23 includes a switched traffic network and a common channel signaling network that carries control signaling messages for the switched telephone traffic network. The telephone traffic network includes a number of end office 36 type central office switching systems and one or more tandem office 38 type central office switching systems. Subscriber stations, depicted as telephones 25, are connected to the end office switches 36. Each end office type central office switch 36 provides switched telephone connections to and from local communication lines or other subscriber links coupled to end users stations or telephone 25. The central offices 36 and 38 of the PSTN route calls based on at least destination addresses input by calling parties' terminal devices. Control processing and ancillary services like caller ID may be based on automatic number identification (ANI) of similar format numbers as origination addresses associated with the calling parties' lines or terminal devices. In the dialing plan discussed herein, the first character may be a special character like # or *, but will typically be a number digit 0-9. Each telephone number type address for a source or destination will include one or more special characters, typically in positions other than the leading first position of each respective character string.

The traffic network portion 21 of the mobile communication network 10 also uses MSC 35 to connect to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, email, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer ("PC") at 31, by way of example. The network 10 also allows SMS (short messaging service), EMS (enhanced messaging service), MMS (multimedia messaging service) or other types of messaging between mobile stations and similar messaging with other devices via the Internet 29. The network 10 typically offers a variety of other data services via the Internet, such as downloads, web browsing, email, etc.

Several mobile stations appear in the drawing, to represent examples of the mobile stations that may receive various services via the mobile network 10, but it should be understood that other communications devices are routed using similar processes. Today, mobile stations typically take the form of portable handsets, smart-phones or personal digital assistants, although they may be implemented in other form factors. Other communication devices may include landlines, computers, televisions, fax machines or any other device capable of communicating via a Mobile Service provider.

A Mobile Directory Number ("MDN") or Mobile Telephone Number ("MTN") is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. The MDN uses a typical telephone number address format, such as the 10-digit telephone number in the North American Dialing Plan. A Mobile Identification Number is also associated with the mobile station. A Mobile Identification Number ("MIN") is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and is the number or address of the mobile station that appears in billing and account records and is accessible via web site or call-in account services. It is contemplated that the MDN would be the number that includes the special non-numeric special characters as dialable digits.

While MDNs and MINs are specific to mobile stations, the format of the MDN is the same as that of a typical telephone number. Landline telephones 25 and other devices like 27 with similar functionality will have a PSTN telephone number assigned either to the device or the line, even if connected to a Voice Over IP (VOIP) service via a cable service provider or other alternative communication network. For purposes of further discussion, we will focus on the processing of an MDN with an understanding that processing of PSTN telephone numbers and the like would occur in a similar fashion.

As stated above, each MDN and each landline telephone number uses the NANP. Under the NANP, a string of 10-numbers identifies not only a particular mobile station, but has also indicated the geographic area where the mobile station is actually located. Under the existing NANP design, number digits 0-9 only may be used as part of the MDN string. Each number digit in the string will have a different meaning depending on its location. For example, traditionally, in an 10-digit telephone number, the digits in the first through third position indicate a Numbering Plan Area Code ("NPA") while the numbers in the fourth through sixth position indicated the Central Office Exchange Code ("NXX"). The Central Office Exchange Code may be associated with a certain provider or type of device. Finally, the final four digits in seventh through tenth position were referred to as the subscriber number.

Each number 0-9 used in a telephone number/MDN under the NANP has an associated tone or digital data signal associated with it that is identifiable by the network and used as an indicator of the number used. Since special characters * and # are used as indicators for certain actions and are available on all phones. Each of the * and # also has its own individual associated tone or digital data signal. In the extended dialing plan, special characters including the * and # are additional dialable digits.

To connect to a destination mobile device through the network, the user of a PSTN telephone or mobile device 15 dials the MDN associated with the destination mobile device.

The 10-digit character string representing the MDN is then sent to MSC 35 for processing. The MSC stores information regarding the MDN such as local geographic location, account information, and the like within a database for the provider. The MSC 35 also decides how to route the data using a look up table. The look up table contains information associated with each position or group of positions within the MDN as discussed further in connection with FIG. 3. This MSC 35 carries out a variety of other functions, but for purposes of further discussion functions associated with using special characters as part of the MDN address and those in support thereof will be focused on.

To connect to another mobile device through the network, the user of a PTSN telephone 25 or mobile device 15 dials the MDN associated with the second mobile device. The 10-digit character string representing the telephone number or MDN is then sent to the MSC for processing. The MSC 35 stores information regarding the MDN such as local geographic location, account information, and the like within a database for the provider. The MSC also decides how to route the data. MSC 35 carries out a variety of other functions, but for purposes of further discussion, functions associated with using special characters as part of the telephone or MDN address and functions in support thereof will be focused on.

Figure 2:
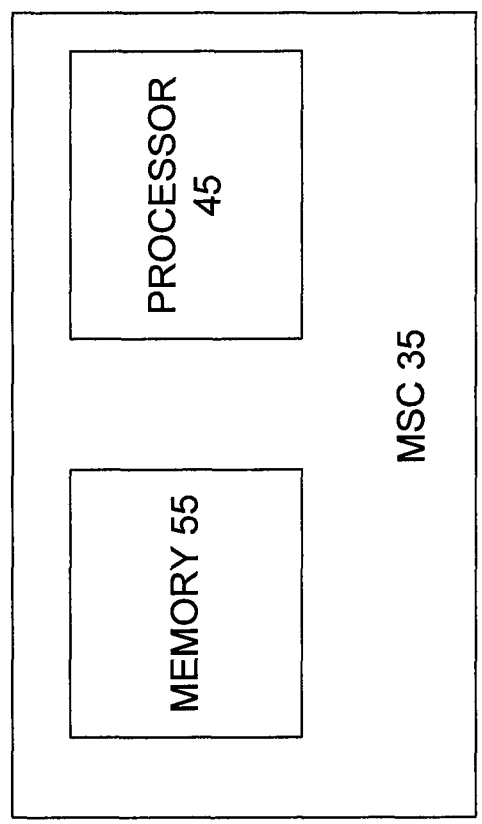
FIG. 2 illustrates a simplified functional block diagram of a Mobile Switching Center identified in FIG. 1.

FIG. 2 is a block diagram of MSC 35. MSC 35 contains one or more processors 45 forming a central processing unit (CPU) and a memory 55. Memory 55 stores routing information and information associated with the MDN, such as account information, billing information and the like. Memory 55 also contains a lookup table used to identify and route the communication to/from an MDN. For simplification of the present discussion, all processing and memory storage occurs on the MSC 35; but it should be noted that the other configurations using a remote element, such as a home location registry and/or service control point to assist and/or control the MSC 35 in its routing decisions, may be implemented to achieve the same result. The memory 55 may also contain a database which stores information associated with each MDN, such as the rights associated with an account as well as other information. For example, it may also include an tElephone Number Mapping (ENUM) application for processing and storing URIs corresponding to MDNs of various mobile stations. In addition memory 55 stores applications used by processor 45 to analyze the MDN. The actual routing or switch fabric of the MSC may be a circuit switched or packet switched arrangement. Although not shown, central offices of the PSTN may be implemented in a similar fashion, albeit without the control programming for aspects related to the RF operations and/or device mobility.

Figure 3:
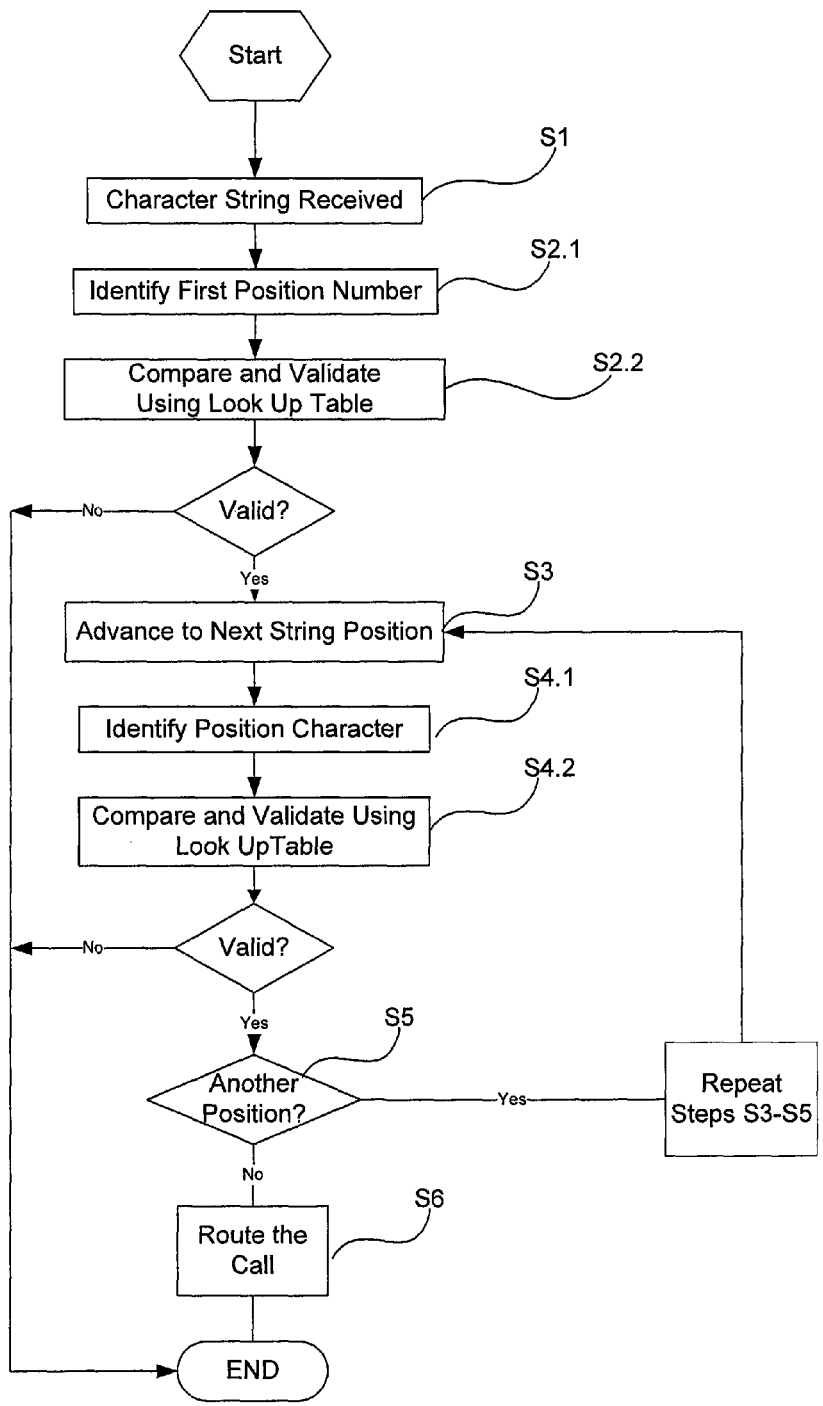
FIG. 3 illustrates a flow chart for an exemplary process for analyzing a character string representing an MDN or other dialable telephone number for purposes of routing a communication through the network of FIG. 1.

With that in mind, it may be useful to now discuss the process flows used to carry out the analysis of the MDN or other telephone number and route the communication from the first communication device to a second communication device. Although the MSC 35 is used to process a request for mobile devices (such as mobile devices 13, 15) in the example used, it should be noted that the central office(s) of the PSTN 35 uses a similar process for directing calls to/from PSTN telephone 25. FIG. 3 shows a flow chart of an exemplary process for analyzing a character string representing an MDN or telephone number for purposes of routing a communication through a network, using the extended dialing plan. For purposes of our example, we will assume that the call originates at a mobile station 13, 15 or 17, however, similar processing may be applied to a call from a PSTN telephone or to a VoIP call via a broadband packet switched network. Hence, in the example, the character string for a destination MDN is received in to the network and is routed to the MSC at step S1.

In the current example, the MDN is a character string containing both number digits and one or more non-numerical special characters. The MDN includes a number digit in the first position of the string and a special character in one or more of the remaining positions. In some examples, the character string is 10-digits in length and the character string includes at least one of * or # as the non-numerical special character.

Upon receipt of a communication into the network, the character string is analyzed at steps S2.1-2.2. This analysis involves examining each individual position in the character string individually in sequential order from the first position through the final position. The number digit in the lead position is identified first at step S2.1 and step S2.2. The number is identified using the number's associated tone or digital data signal at step S2.1 and then compared to a data set or look up table in step S2.2. The look up data uses the characters received and analyzes them in terms of their positions. For example, if a number "1" was identified as the first number in the character string, the application would compare the number received, in this case a "1," with the subset of data and information provided by the table for the lead position. If no information was provided for the number, then analysis would stop. In some circumstances, an error message would be received. Upon determination of the number digit in the first position, the analysis will move on to the next position in the character sequence at step S3. Identification of the character based on tone/digital data signal of that character, number digit or special character, would occur at step S4.1. It should be noted that, as stated above, * and # already have an associated digital data signal/tone under the current system for use as an indicators for certain functions but other characters under the current system do not. In order to use another character in an MDN or telephone number string, an associated tone would need to be created and added to the application.

Once the special character is identified for a certain position, the character will be compared to characters provided in the subset of data for that position at step S4.2. Under the current system, only number digits are included in the data subsets for each position in the character string such that use of the special character would not be considered a valid character within a string. To put it another way, in the current system the special characters * and # each have an associated tone or digital data signal that is recognized by the network, but lack a valid position within the character string of a destination address within the table. In order to incorporate, special characters into the character string representing an MDN, data within the lookup table is updated to assign meaning to the special characters based on their positions within the string.

Following identification/validation of the character in the relevant position at step S4.2, a determination whether another position in the string exists occurs at step S5. If another position in the string does exist, steps S3 through S5 are repeated until each character in each position of the string is identified. Once the order of the digits of the entire sequence of the character string is known, the communication will be routed to the device associated with the identified address at step S6.

The discussion above has focused on analysis of a dialed character string (dialed by a user, autodialed from a contact list, or the like). Those skilled in the art will appreciated, however, that the addition of special characters to the dialing plan will also be reflected in origination addressing and associated processing. For example, in a mobile network, the network authenticates and track attachment position of a mobile device based on its MDN. Applications that handle such functions at the MSC and/or other network control nodes would be enhanced to use the added special characters for those purposes as well. Similarly, control, ANI, caller ID, etc. in the PSTN would be enhanced to include the special characters in appropriate positions of the origination addresses/numbers.

In many cases, the processing of the extended dialing plan discussed above will be implemented by appropriate programming, for example, in the MSCs of a mobile network, in the central offices of a PSTN network, in soft switches of a VoIP network, etc. The elements executing such programming may be special purpose router or switching platforms. In other cases, the elements may use general purpose computer hardware to implement the analysis and routing control functions.

Figures 4, 5:
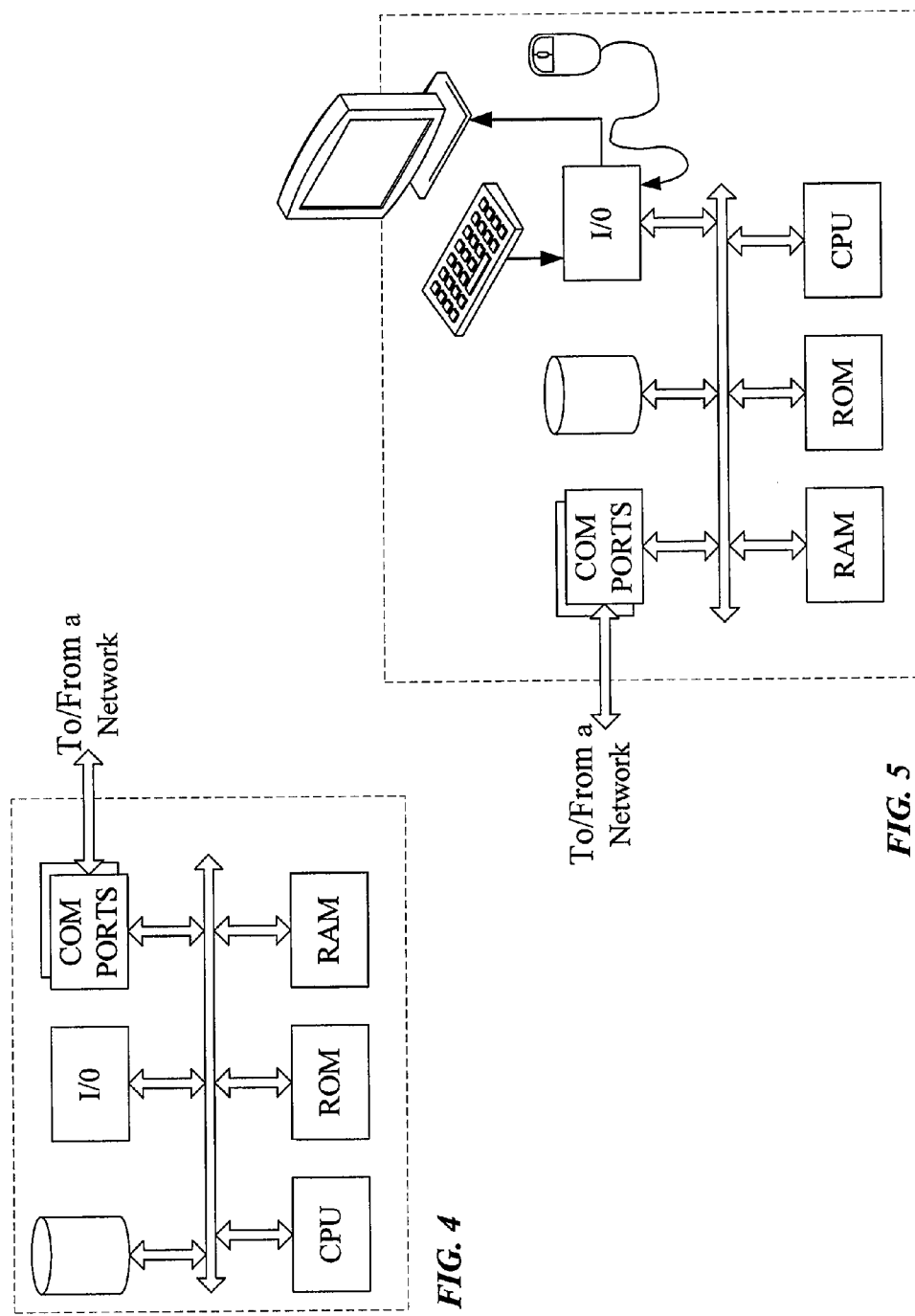
FIG. 4 is a simplified functional block diagram of a computer that may be configured as a host or server, for example, to function as the central processing and memory elements of the MSC or central office for as server of a soft switch.
FIG. 5 is a simplified functional block diagram of a personal computer or other work station or terminal device.

FIGS. 4 and 5 provide functional block diagram illustrations of general purpose computer hardware platforms which may be used by the processor and memory of the MSC or central office or as a soft switch for control of routing for a VoIP call, to store and process the applications and data identified in the steps above. FIG. 4 illustrates a network or host computer platform, as may typically be used to implement a server. FIG. 5 depicts a computer with user interface elements, as may be used to implement a user terminal or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Similarly, a user terminal includes a data communication interface for packet data communication. The user terminal also includes a CPU, in the form of one or more processors, for executing program instructions. The user terminal platform typically includes an internal communication bus, program storage and data storage for various data files to be processed and/or communicated by the user terminal. The hardware elements, operating systems and programming languages of such user terminal are conventional in nature, and it is presumed that those skilled in the art are adequately familiar therewith. Of course, the user terminal functions may be implemented in a distributed fashion on a number of similar platforms, to distribute the processing load.

Hence, aspects of the methods for using special characters as dialable digits in an MDN or telephone number as outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, may be used to implement the process shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It is understood that various modifications may be made to the disclosed subject matter and that the disclosed subject matter may be implemented in various forms and examples, and that the teachings may be applied in numerous applications, only some of which have been described herein.

What is claimed is:

1. A method, comprising steps of:
receiving at an element of a telecommunication network from a first communication device a telephone call, wherein the telephone call includes a destination telephone address assigned to a second communication device and used for routing the telephone call from the first communication device through the network to the second communication device, and wherein the destination telephone address is represented by a string of characters including number digits and at least one non-numerical special character, one of the number digits being in the leading position in the string, and each non-numerical special character being at a position in the string other than the leading position;
analyzing the string including the at least one non-numerical special character including validating the string using a look-up-table containing numerical characters and the at least one non-numerical character; and responsive to the analysis, routing the telephone call through the network, based at least in part on the at least one non-numerical special character included in the string.

2. The method of claim 1, wherein the string is formatted as a ten digit telephone number.

3. The method of claim 2, wherein each non-numerical special character is one of a # character and a * character.

4. The method of claim 1, wherein the network is a wireless mobile communication network, and at least the first communication device is a wireless communication device.

5. The method of claim 1, wherein analyzing the string comprises identifying the one number digit in the lead position and identifying the number digit or non-numerical character located at each subsequent position within the string individually, based on sequential position within the string.

6. The method of claim 1, wherein analyzing the string comprises:
   comparing the string to a data set to determine if the address identified by the string exists; and
   upon determining that the address associated with the string exists, informing another element of the network that the communication should be routed.

7. The method of claim 1, wherein routing the communication comprises sending the communication from the first device through the network to the second device using the string of characters as the destination address.

8. The method of claim 7, wherein routing the communication comprises:
   identifying a geographic location of the second communication device associated with the destination address based at least in part upon a sequence of characters contained in a portion of the string; and
   routing the telephone call through the network based on the identified geographic location.

9. The element of the network configured to implement the method of claim 1.

10. A telecommunication network comprising a plurality of elements for routing communications through the network, wherein at least one of the elements of the network is configured to be capable of implementing functions including functions to:
    receive from a first device a telephone call, wherein the telephone call includes a destination telephone address assigned to the second device and used for routing the telephone call through the telecommunication network from the first device to the second device, and wherein the destination telephone address is represented by a string of characters including number digits and at least one non-numerical special character;
    analyze the string including the at least one non-numerical special character including validating the string using a look-up-table containing numerical characters and the at least one non-numerical character; and
    responsive to the analysis, route the communication through the telecommunication network, based at least in part on the at least one non-numerical special character included in the string.

11. The telecommunication network of claim 10, wherein the string is formatted as a ten digit telephone number, the digit in the leading position in the string being a number digit.

12. The telecommunication network of claim 10, wherein the non-numerical special character is one of a # character and a * character.

13. The telecommunications network of claim 10, wherein the network is a wireless mobile communication network, and the first device is a wireless communication device.

14. The telecommunications network of claim 10, wherein the function to route the communication includes functions to:
    identify a geographic location of the second device associated with the destination address based at least in part upon a sequence of digits contained in a portion of the string; and
    route the telephone call through the network based on the identified geographic location.

15. An article of manufacture, comprising:
    a non-transitory, machine readable storage medium; and
    information embodied in the medium for configuring an element of a telecommunications network to be capable of performing functions, wherein the functions include functions to:
    receive from a first device a telephone call, wherein the telephone call includes a destination telephone address assigned to a second device and used for routing the telephone call through a telecommunication network from the first device to the second device, and wherein the destination telephone address is represented by a string of characters including number digits and at least one non-numerical special character;
    analyze the string including the at least one non-numerical special character including validating the string using a look-up-table containing numerical characters and the at least one non-numerical character; and
    responsive to the analysis, route the telephone call through the telecommunication network, based at least in part on the at least one non-numerical special character included in the string.

16. The article of manufacture of claim 15, wherein the string is formatted as a ten digit telephone number, the digit in the leading position in the character string being a number digit.

17. The article of manufacture of claim 16, wherein the non-numerical special character is one of a # character and a * character.

18. The article of manufacture of claim 15, wherein the function to analyze the string comprises the function to identify the number digit or non-numerical character located at each position within the number string individually based on sequential position within the string.

19. The article of manufacture of claim 15, wherein the function to analyze the string further comprises the function to:
    compare the string to a data set to determine if the address identified by the string exists; and
    upon determination that the address associated with the string exists, inform the network that the communication should be routed.

20. The article of manufacture of claim 15, wherein the function to route the communication includes functions to:
    identify a geographic location of the second device associated with the destination address based at least in part upon a sequence of digits contained in a portion of the character string; and
    route the telephone call through the network based on the identified geographic location.

* * * * *